March 20, 1951  F. HESTERBERG  2,545,781
HAND GUIDED TRACTOR

Filed June 7, 1946  2 Sheets-Sheet 1

Inventor

Frederick Hesterberg,

By Clarence A. O'Brien
and Harvey B. Jacobson
Attorneys

March 20, 1951 — F. HESTERBERG — 2,545,781
HAND GUIDED TRACTOR
Filed June 7, 1946 — 2 Sheets-Sheet 2

Inventor
Frederick Hesterberg,
By Clarence A. O'Brien
and Harvey B. Jacobson
Attorneys

Patented Mar. 20, 1951

2,545,781

UNITED STATES PATENT OFFICE 2,545,781

HAND GUIDED TRACTOR

Frederick Hesterberg, Norborne, Mo.

Application June 7, 1946, Serial No. 675,204

1 Claim. (Cl. 180—19)

The present invention relates to new and useful improvements in plows and more particularly to a walking plow having a power plant mounted thereon for driving a ground wheel to move the plow over a field.

An important object of the present invention is to provide a belt drive between the power plant and the wheel of the plow together with novel control means for throwing the power plant into and out of driving engagement and operating as a belt tightening means.

A further object of the invention is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
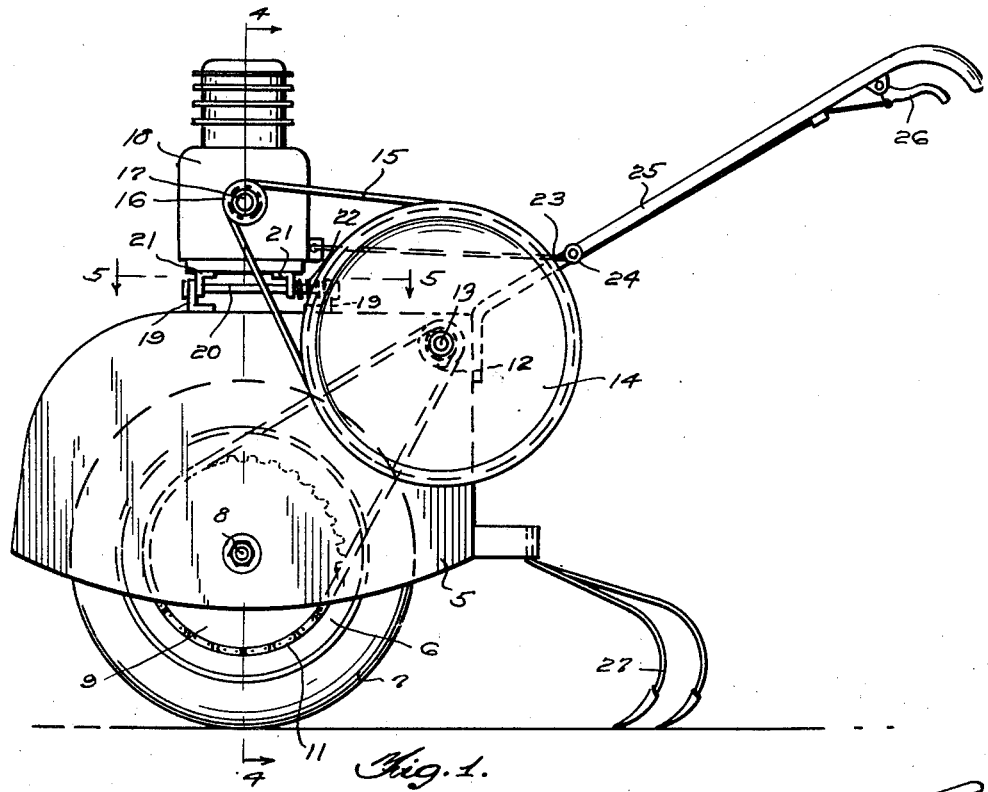
Figure 1 is a side elevational view.
Figure 2:
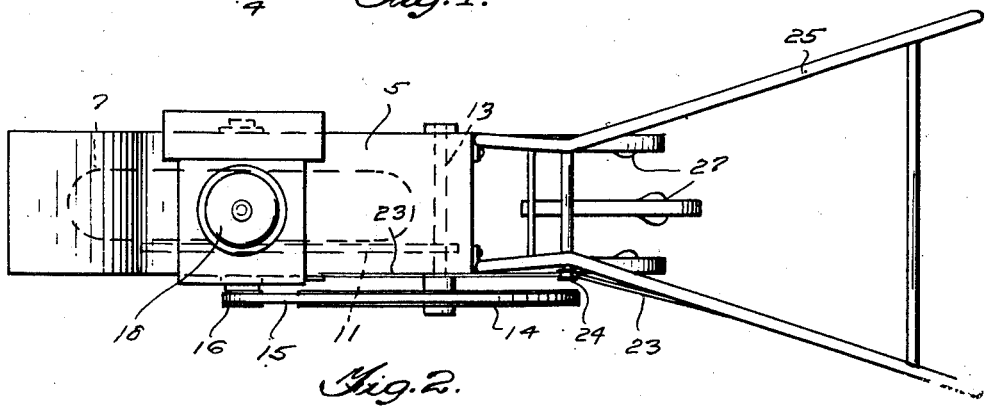
Figure 2 is a top plan view.
Figure 3:
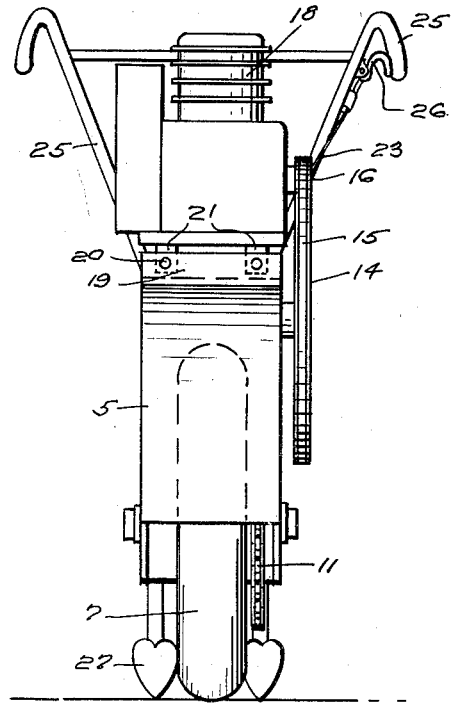
Figure 3 is a front elevational view.
Figure 4:
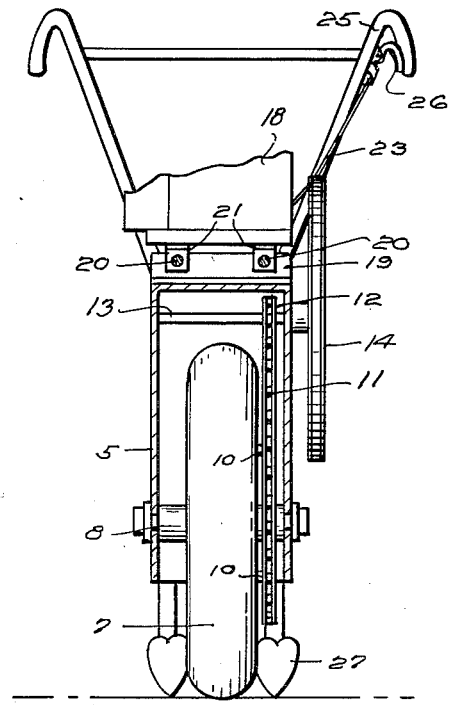
Figure 4 is a vertical transverse sectional view taken on a line 4—4 of Figure 1.
Figure 5:
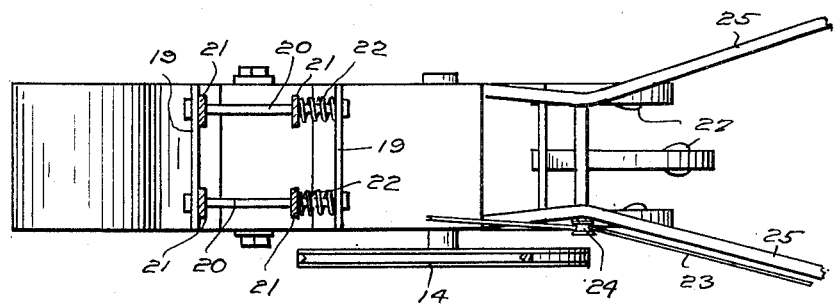
Figure 5 is a horizontal sectional view taken on a line 5—5 of Figure 1.

Referring to the drawings in detail wherein for the purpose of illustration, I have disclosed a preferred embodiment of the invention, the numeral 5 designates a sheet metal hood or guard for a wheel 6 preferably having a pneumatic tire 7 mounted thereon. The wheel is mounted on an axis 8 which extends transversely of the guard 5, the wheel being journaled on the axle.

A sprocket wheel 9 is secured to one side of the wheel 6 for rotation as a unit by means of bolts or the like 10, the sprocket being driven by a chain 11 from a sprocket 12 secured on a transverse shaft 13 journalled in the upper rear portion of the guard 5. The shaft 13 projects outwardly at one side of the guard and to which is secured a pulley 14. The pulley 14 is driven by a belt 15 from a pulley 16 secured to the drive shaft 17 of a power plant 18 preferably in the form of an internal combustion engine.

The diameter of the sprockets 9 and 12 and of the pulleys 14 and 16 is such that the sprocket 9 will be driven at a reduced speed from the shaft 17 of the power plant as will be clearly indicated by an inspection of Figure 1 of the drawing.

To the upper edge of the guard 5 is welded or otherwise suitably secured a pair of transversely extending spaced apart angle iron members 19 having a pair of longitudinally extending rods 20 secured thereto, the rods being arranged in spaced parallel relation with respect to each other. Angle iron brackets 21 are suitably secured to the bottom of the base of the power plant 18 and are mounted on the rods 20 for forward and rearward sliding movement. Coil springs 22 are mounted on the rods between the rear brackets 21 and the rear angle iron members 19, the springs normally urging the power plant forwardly on the rods 20 to tighten the belt 15 and to maintain the sprocket 9 in driving engagement with the power plant.

A cable 23 is attached at one end to the rear of the power plant 18 and extends rearwardly under a pulley 24 secured to one of the handles 25 which projects rearwardly from the upper portion of the guard 5. The cable extends rearwardly along the handle 25 and is attached to a lever 26 pivoted to the handle. A squeezing action subjected to the lever 26 by the hand of the operator when gripping the handle 25 will cause the rearward pulling force on the cable 23 whereby to slide the power plant 18 on the rods 20 and produce slack in the belt 15 whereby to throw the pulley 14 and sprockets 13 and 9 and chain 11 out of driving engagement.

A group of plows or cultivator blades 27 of conventional construction are attached to the rear lower portion of the guard 5.

During the operation of the device, the plow is guided over the field by the handles 25 in the usual manner and traction of the wheel 6 is provided by reason of its driving connection with the power plant 18 to drive the plow over the field.

In view of the foregoing description taken in conjunction with the accompanying drawings it is believed that a clear understanding of the construction, operation and advantages of the device will be quite apparent to those skilled in the art. A more detailed description is accordingly deemed unnecesssary.

It is to be understood, however, that even though there is herein shown and described a preferred embodiment of the invention the same is susceptible to certain changes fully comprehended by the spirit of the invention as herein described and the scope of the appended claim.

I claim:

A power-operated walking plow comprising a body having a handle, a power plant, a pair of cross bars on said body, a pair of guide rods on said bars, front and rear bottom brackets on said power plant slidably mounted on said guide rods and supporting said power plant on said rods for advance and retraction, a traction wheel supporting said body, a drive between said plant and wheel including a belt tightened by advance of said plant and loosened by retraction of said plant, helical springs on said rods between one cross bar and said rear brackets for advancing said plant and yieldingly opposing retraction of said plant, a hand grip lever pivoted on said handle for squeezing toward the handle by a hand grasping said handle and lever, and a pull cable connection between said plant and lever for retracting said plant in opposition to said springs when said lever is squeezed toward said handle, said lever being freely swingable away from said handle when released to permit advance of said plant by said springs.

FREDERICK HESTERBERG.

REFERENCES CITED

The following references are of record in the file of this patent:

UNITED STATES PATENTS

| Number | Name | Date |
|---|---|---|
| 1,455,046 | Downie et al. | May 15, 1923 |
| 1,570,591 | Mercer | Jan. 19, 1926 |
| 2,082,600 | Squires et al. | June 1, 1937 |
| 2,260,344 | Shaw | Oct. 28, 1941 |